M. C. SHARPNACK.
SAFETY RAZOR.
APPLICATION FILED MAY 24, 1913.

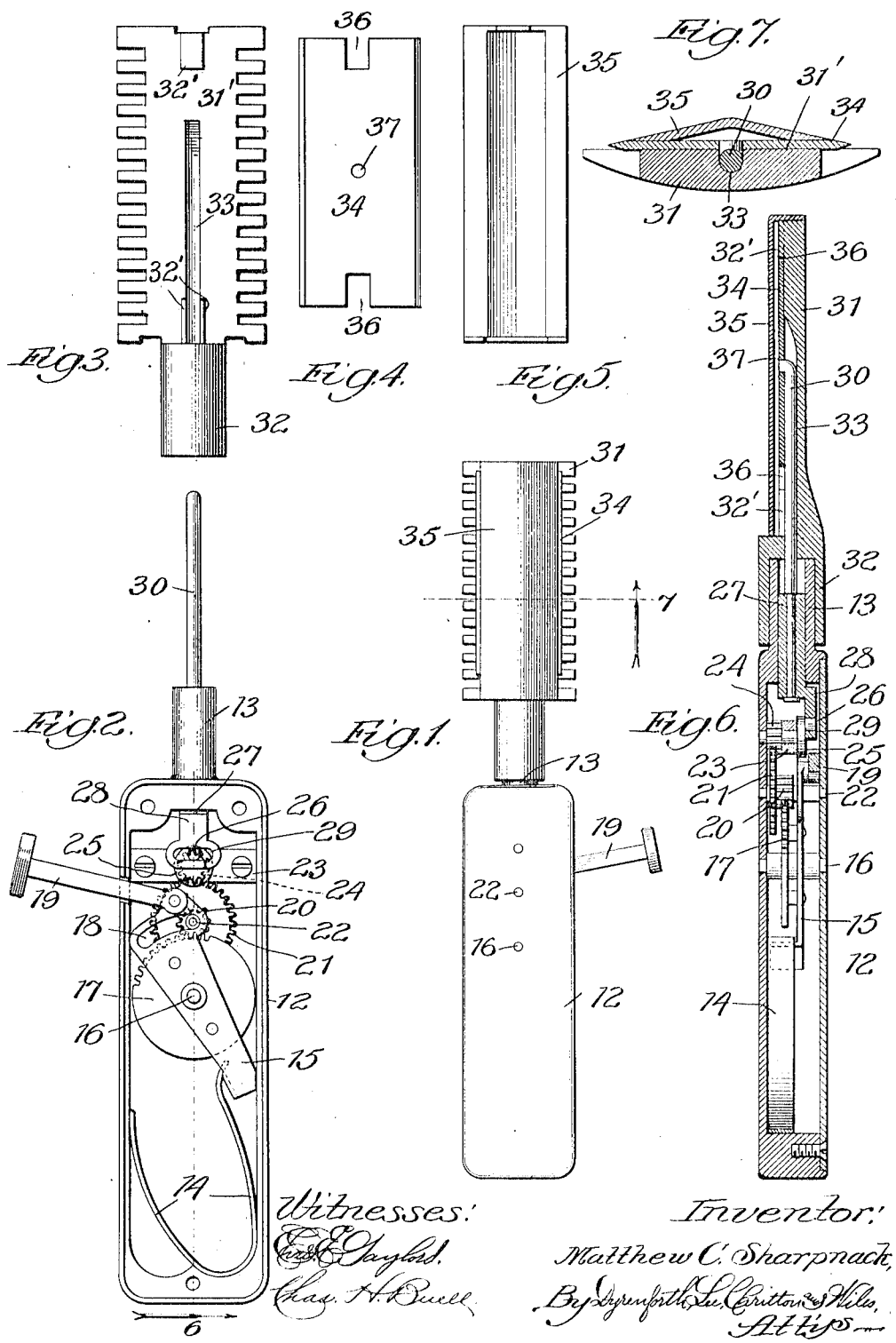

1,089,727.

Patented Mar. 10, 1914.
2 SHEETS—SHEET 2.

Witnesses:

Inventor,
Matthew C. Sharpnack,
By Dyrenforth, Lee, Chritton and Wiles,
Attys.

UNITED STATES PATENT OFFICE.

MATTHEW C. SHARPNACK, OF PRESCOTT, ARIZONA.

SAFETY-RAZOR.

1,089,727.  Specification of Letters Patent. Patented Mar. 10, 1914.

Application filed May 24, 1913. Serial No. 769,596.

*To all whom it may concern:*

Be it known that I, MATTHEW C. SHARPNACK, a citizen of the United States, residing at Prescott, in the county of Yavapia and State of Arizona, have invented a new and useful Improvement in Safety-Razors, of which the following is a specification.

My invention relates to an improvement in the class of safety-razors, in which the blade is oscillated on the blade-plate, to cut like the sickle in a harvesting machine, by a motor in the razor-handle.

Figure 10:
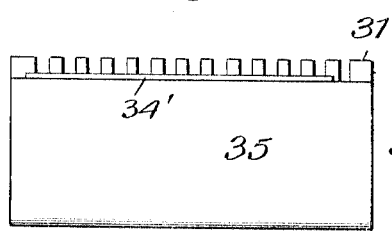
Figure 11:
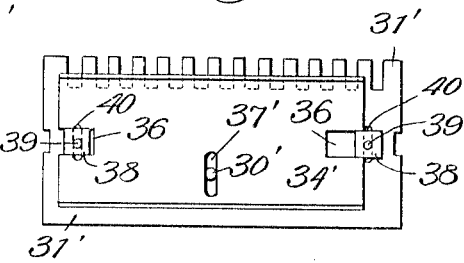
Figure 8:
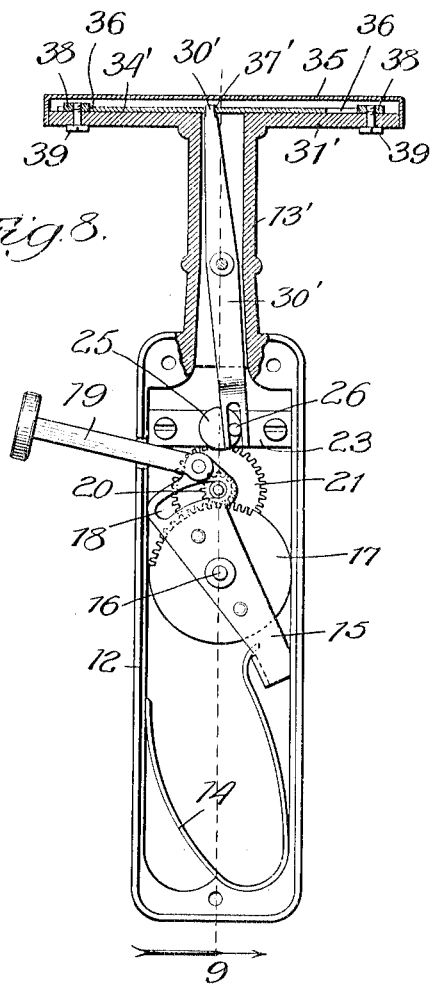
Figure 9:
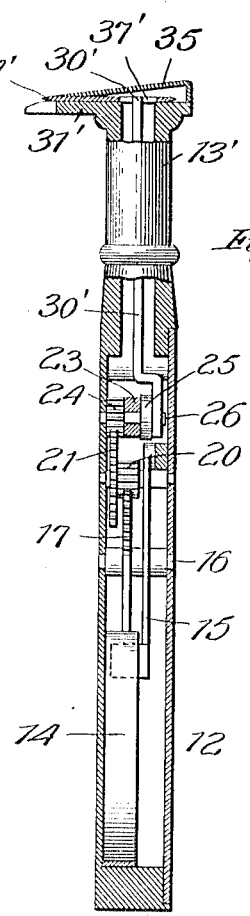

In the accompanying drawings, Figure 1 is a view in rear elevation of my improved safety-razor; Fig. 2 is an enlarged view of the hollow handle and blade-actuating stem extending from it, with the face-plate of the handle removed to display the motor-mechanism within it; Fig. 3 is a view in elevation of the socketed blade-plate; Fig. 4 is a similar view of the blade; Fig. 5 is an inner face view of the keeper; Fig. 6 is a view in sectional elevation, the section being on line 6, Fig. 2; Fig. 7 is an enlarged section on line 7, Fig. 1; Fig. 8 is a view like that presented in Fig. 2, showing a modified construction; Fig. 9 is a view in sectional elevation, the section being taken on line 9, Fig. 8; Fig. 10 is a plan view of the front end of the safety-razor, and Fig. 11 is a similar view of the same with the guard-plate removed.

Referring more particularly to Figs. 1 to 7, inclusive:

The handle 12 is hollow and has a neck 13 on its forward end. Within the handle is confined a leaf-spring 14, with one end engaging the bent end of a lever 15 fulcrumed between its ends on the journal 16 of a gear 17, shown mutilated, to which the lever is pinned at opposite sides of the fulcrum; and the lever widens toward its opposite end and contains therein an arc-shaped slot 18, adjacent to which is pivotally connected with it, at its inner, extended corner, the inner end of a finger or thumb piece 19 working through a slot in a side of the handle. A pinion 20 meshes with the teeth of the gear 17 and is on a gear-wheel 21 journaled in the handle, the journal 22 passing through the lever-slot 18. On a bearing 23 provided in the handle near its forward end, and in the back-plate of the handle, is journaled a pinion 24 carrying on its journal a cam comprising a disk 25 provided with an eccentric stud 26. A sleeve 27 is confined reciprocatingly in the forward end of the handle to work in the neck 13, and it has extending from its inner end and offset tongue 28 containing a transverse slot 29 in which the stud 26 works. Thus, by pushing inward the finger-piece 19 to turn the lever 15, the spring is tensioned and upon releasing the finger-piece to permit the spring to recoil, the gearing is actuated to rotate the cam and actuate its stud 26 to work in the slot 29 and thereby reciprocate longitudinally the sleeve 27 and with it a stem 30 secured therein.

The blade-plate 31 has a thimble 32 extending from one end to fit tightly over the neck 13, but permitting it to be turned therein for adjusting the blade-plate thereon for the convenience of the user in shaving. Guide-lugs 32' are provided on the face of the blade-plate to extend centrally of the length of the plate from its opposite edges, and a central longitudinal groove 33 extends in the face of the blade-plate for the stem 30 to work in. The blade 34, which is confined, as usual, by a retaining plate 35 to be reciprocated lengthwise on the face of the blade-plate and cut at either edge, contains slots 36 centrally in the ends for guiding it on the lugs 32'; and the stem engages at its bent forward end the blade at a central aperture 37 in the latter.

The user, by reciprocating the finger-piece 19, as with his thumb, causes the spring motor, composed of the spring, the lever and gears, with the cam, in the handle, in reciprocating the stem 30, to oscillate the blade to exert its cutting action; the gearing being such as to cause each stroke of the thumb or finger piece to effect several reciprocations of the blade.

In the modified construction illustrated in Figs. 8 to 11, inclusive, the main difference from the construction already described, is that the stem 30 is provided in the form of a lever 30' (Figs. 8 and 9) fulcrumed between its ends, and actuated by the cam to reciprocate the blade 34' transversely of the handle. The hollow neck 13' is longer than the neck 13, and carries a blade-plate 31' on its forward end, preferably as an integral part thereof, to extend transversely of the handle. The finger-piece 19 works the lever 15 against a spring 14, the lever being pinned to a mutilated gear-wheel 17, fulcrumed at 16 and containing a slot 18 through which extends the journal of a gear-wheel 21 carrying a pinion 20 meshing with the gear 17, and the wheel 21 driving a pinion having a disk 25 on its journal and provided with an eccentric stud 26; all as shown and described with reference to Figs. 1 to 7, inclusive. The lever 30' is fulcrumed between its ends in the neck 13' to engage at its offset slotted inner end with the cam-stud and, at its opposite end a transverse slot 37' in a blade 34', midway between its ends, the blade-plate adapting this blade to cut only at one edge; and the recesses 36 in the blade-ends receive, for guidance, nuts 38 on clamp-screws 39 working through transverse slots 40 in the blade-plate near its ends. With the nuts 38 loosened, the blade may be adjusted on the plate to regulate its depth of cut, this being permitted by the slots 37' and 40; and the nuts serve, by tightening them in the adjusted position of the blade, to hold and guide it thereon.

I realize that considerable variation is possible in the details of construction thus specifically shown and described, and I do not intend by illustrating a single, specific or preferred embodiment of my invention, to be limited thereto; my intention being in the following claims to claim protection upon all the novelty there may be in my invention as broadly as the state of the art will permit.

What I claim as new and desire to secure by Letters Patent is:—

1. In a safety-razor, the combination of a hollow handle, a motor housed in the handle, comprising a spring-pressed lever fulcrumed between its ends, and a train of gears having its innermost member secured to said lever, a finger-piece pivotally connected at its inner end with one end of said lever and longitudinally reciprocable through the handle-wall to rock the same and drive the motor, a blade-plate on the handle, a blade confined on said plate, and means connecting the motor with the blade to reciprocate the latter by manipulating the finger-piece.

2. In a safety-razor, the combination of a hollow handle, a spring-motor, including a train of gears, housed in the handle, a blade-plate on the handle, a blade confined on said plate to be reciprocated thereon, a finger-piece longitudinally reciprocable through the handle-wall and connected with the motor for operating it, a cam connected with the outermost gear of said train, and a stem having a slotted inner end engaged by the cam and engaging at its opposite end with the blade to reciprocate it by operating the motor.

3. In a safety-razor, the combination of a hollow handle having a neck on its forward end, a spring-motor in the handle and a blade-plate on the latter, a blade confined on said plate to be reciprocated thereon, a finger-piece working through a wall of the handle for operating said motor, a cam connected to said motor and comprising a disk geared provided with an eccentric stud, a sleeve reciprocably confined in said neck and having a tongue on its inner end containing a transverse slot engaged by said stud, and a stem confined at one end in the sleeve and engaging at its opposite end the blade to reciprocate it by the action of the motor.

4. In a safety-razor, the combination of a hollow handle having a neck on its forward end, a spring-motor in the handle, a finger-piece working through a wall of the handle for operating said motor, a blade-plate having a thimble at which it seats about said neck and containing a longitudinal groove in its face, a blade confined on said plate to be reciprocated thereon, and a stem having a cam-connection at one end with the motor and extending through said neck and thimble and in said grove into engagement at its opposite end with the blade to reciprocate it by operating the motor.

MATTHEW C. SHARPNACK.

In presence of—
D. C. THORSEN,
A. C. FISCHER.